Feb. 4, 1941.  G. H. PFEFFERLE  2,230,468
PIPE COUPLING FOR PLAIN END PIPE
Filed May 9, 1940  3 Sheets-Sheet 1

Feb. 4, 1941.   G. H. PFEFFERLE   2,230,468
PIPE COUPLING FOR PLAIN END PIPE
Filed May 9, 1940   3 Sheets-Sheet 3

INVENTOR
George H. Pfefferle
BY
Louis Trevost Whitaker
ATTORNEY

Patented Feb. 4, 1941

2,230,468

UNITED STATES PATENT OFFICE 2,230,468

PIPE COUPLING FOR PLAIN END PIPE

George H. Pfefferle, Bradford, Pa., assignor to Dresser Manufacturing Company, Bradford, Pa., a corporation of Pennsylvania Application May 9, 1940, Serial No. 334,146

2 Claims. (Cl. 285—196)

My invention is an improvement in pipe couplings and process of connecting pipe sections, and consists in the novel features hereinafter described, reference being had to the accompanying drawings which illustrate the preferred embodiment of my invention, and said invention is fully disclosed in the following description and claims.

My present invention relates to rubber packed pipe couplings of the well known "Dresser" type, and finds its greatest use in coupling together pipe sections formed of steel or iron bent into cylindrical form and welded, and of very large diameter, particularly pipe sizes having an outside diameter of from 48 to 72″ or greater, while it is not limited to use in connection with such large pipes, and may be used with smaller diameter pipes, and thus formed otherwise if it is found advantageous or desirable.

Rubber packed pipe couplings of the well-known "Dresser" type ordinarily comprise a middle ring or sleeve which extends over and encloses the adjacent ends of the pipe sections to be connected, being preferably provided centrally of its length on its interior with inwardly projecting portions usually in the form of an annular flange or bead for the purpose of centering the sleeve over the pipe ends and being also provided at each end with a packing recess. In association with the middle ring there is provided a packing ring or gasket in each of the packing recesses and two followers for engaging the outer portions of the gaskets, the followers being in turn provided with a circular series of bolts, usually in the form of through bolts extending from one follower to the other for compressing the gaskets into the recesses of the middle ring and against the exterior surfaces of the pipe sections to form a fluid tight joint. The followers, and particularly those used in connection with the smaller sizes of pipe, and those which are of substantially true cylindrical form, are usually provided with an annular flange which extends over the adjacent end of the middle ring in close contact therewith so as to enclose the portion of the adjacent gasket which projects outside of the packing recess of the middle ring and prevent cold flow thereof.

Obviously, under such circumstances, the bolt holes for the clamping bolts must lie in a circle of considerably greater diameter than the diameter of the enclosing flange of the packing enclosing flange of the follower, and are formed in outwardly extending flange portions of the follower which are thereby subjected to a turning moment when the bolts are tightened. This turning moment depends upon the bolt strain and that in turn depends largely on the amount of internal pressure to which the pipe line is subjected, and in the case of high pressure pipe lines, this internal pressure may be extremely high, as from 300 to 1,000 lbs. per square inch, for example, in which case the turning moment of the follower will be very great, and the followers must be provided with sufficient strength to withstand this turning moment, which increases the cost of their production.

It is found in practice that in the larger sizes of pipe and particularly steel or iron pipe of the character above referred to, fabricated by present methods, the pipe sections are by no means truly cylindrical, and present surface irregularities of very considerable extent. These irregularities take the form of flat spots or buckles in the pipe wall, having a radius considerably greater or considerably less than the nominal or standard radius of the pipe. The greatest deviation from a true circle in cross section generally occurs at the seam or seams where the plate or plates forming the pipe wall are welded together, and at the ends of the crimped portions of the pipe. It follows therefore that the clearance between the pipe and the middle ring, which is, to all intents and purposes truly cylindrical, will be little or nothing at some portions of the surface of the enclosed pipe, while at other points, the clearance will be very much greater. It also follows, therefore, that by reason of this variation in the distance between the exterior of the pipe section and the interior of the middle ring at different points around the pipe, the gaskets which are composed of rubber or rubber composition will be crowded inwardly into the packing recesses of the middle ring much further at some points around the periphery of the pipe than at other points.

The resilience of the gaskets when under compression by the followers will accommodate a very considerable variation of this kind in the outer surface of the pipe, but when the variation exceeds reasonable limits, the follower provided with the enclosing flange will be unable to apply adequate pressure at the points where the distance between the interior of the middle ring and the exterior of the pipe permits maximum penetration of the gasket. Because the enclosing flange effectively confines the gasket, the follower will be supported at points of minimum gasket penetration so that adequate pressure cannot be applied to points of maximum gasket penetration to prevent the coupling from leaking at the latter points under high line pressure.

To meet this situation, my invention provides an angle bar follower having no gasket confining flange portion, and having the general form in cross section of an angle bar, one flange of which is perpendicular to the axis of the pipe, and which is provided with the circular series of bolt holes to receive the clamping bolts, the other flange being located outside of the circular series of bolt holes and extending longitudinally of the coupling for the purpose of strengthening the follower and enabling it to withstand the turning moment due to the strain of the bolts. This angle bar follower has no gasket confining flange, and can therefore compensate for the very material irregularities in the diameter of the pipes, and the gasket is free to extrude radially at the points where the pipe wall approaches closely to the inner surface of the middle ring so as to insure that sufficient pressure is applied to the portions of the gasket where the greatest space between the pipe and the interior of the middle ring exists to make a perfectly satisfactory packing to withstand the greatest internal pressure to which the pipe line may be subjected.

It will also be seen that with this type of follower, the bolt holes may be placed very much closer to the exterior surface of the pipe, as it is only necessary that the bolts shall clear the maximum diameter of the middle ring. This in itself materially reduces the turning moment to which the follower is subjected and the outwardly projecting portions of the gasket are practically unconfined except where they may come into contact with the bolts themselves, leaving portions between the bolts free to expand still further, if necessary.

In this manner substantially all portions of the gasket between the middle ring and the exterior of the pipe are subjected to substantially equal compression. After this equalization of gasket pressure has been obtained, I prefer to fill the annular space between the angle bar follower and the enclosed portions of the middle ring and gasket with a suitable material in the form of a plastic which will adapt itself to the exterior portions of the gasket, and which will harden in situ, so as to perform the same function of enclosing the exterior irregular portions of the gasket and prevent subsequent cold flow that is performed by the gasket confining flange of the ordinary follower, generally referred to as the T-bar follower.

Referring to the accompanying drawings which illustrate the preferred form in which I have contemplated embodying my invention—

Fig. 2a is a sectional view through a portion of a pipe section and enclosing middle ring, drawn to a larger scale than in Fig. 2, and illustrating more graphically than can be done by the scale shown in Fig. 2, typical out of round conditions actually encountered in commercial pipe.

Figure 2:
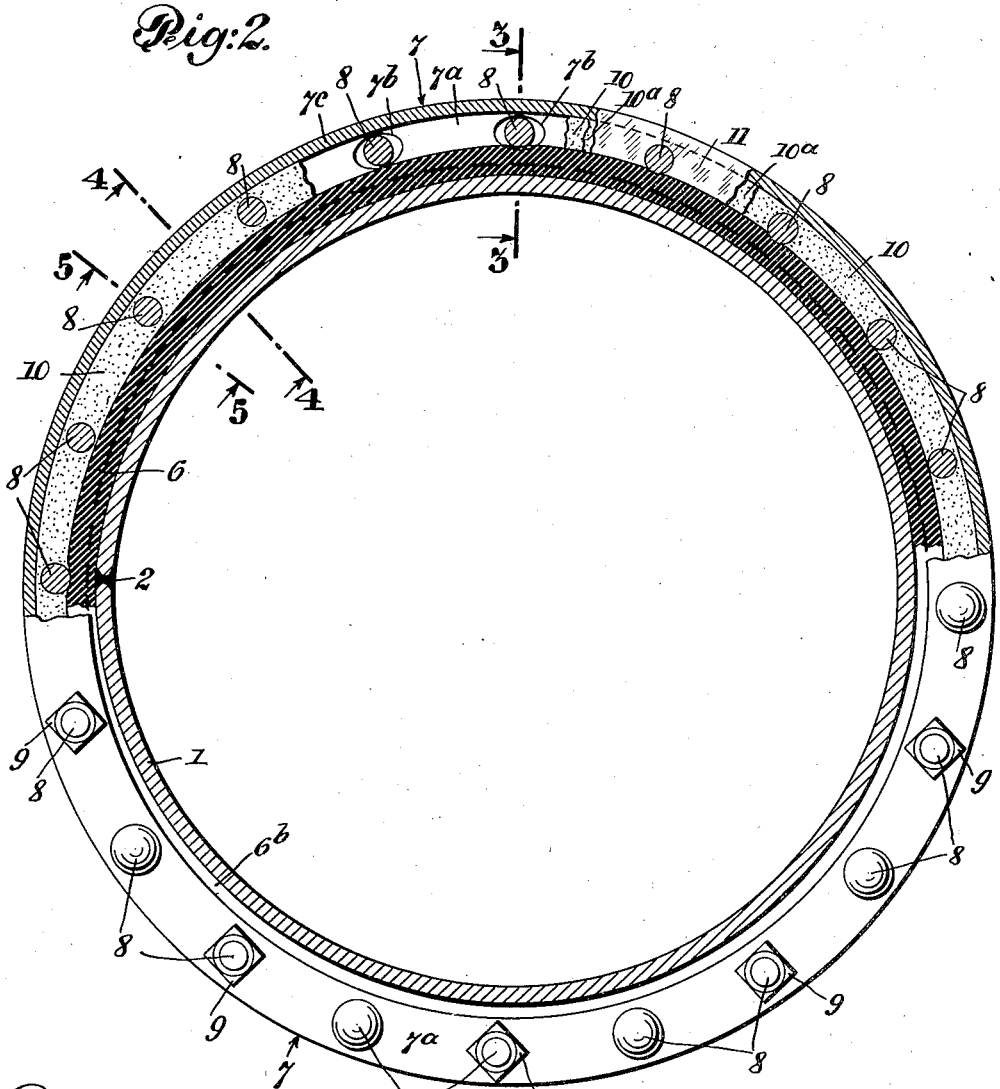
Fig. 2 represents a transverse sectional view of the upper portion of Fig. 1 on the line 2—2, looking in the direction of the arrow, the lower portion of the figure being in elevation.

Referring to the accompanying drawings, 1—1 represent two pipe sections to be united in a line, each being formed by bending a sheet of iron or steel into circular form, and welding the ends together, as indicated at 2 in Fig. 2.

3 represents the middle ring or sleeve provided with a centering stop or flange 4, and outwardly flaring portions 5, at each end, forming packing recesses. 6—6 represent the gaskets of rubber or rubber composition which in this instance have a conical or wedge shaped portion 6a, adapted to fit against the flaring portions of the middle ring and having an exterior portion 6b, which will lie outside of the packing recesses formed at the opposite ends of the middle ring.

7—7 represent the angle bar followers, each of which comprises the annular flange portion 7a, disposed perpendicular to the axis of the pipe, and provided with a circular series of bolt holes 7b, preferably oval in form, as indicated in Fig. 2, the follower being provided with the cylindrical portion 7c, substantially coaxial with the center of the pipe and bracing the annular flange portion 7a against turning moment. 8 represents clamping bolts for engaging the flange portions 7a of the followers, and being in this instance through bolts, and 9 are the nuts engaging the bolts for drawing the followers in a direction toward the center of length of the middle ring, and in this instance, toward each other. It is to be understood that a series of short bolts at each end of the coupling, connecting portions of the middle ring or the bell of a bell and spigot joint, with the follower in a well-known manner, can be used in place of the through bolts although I prefer to employ through bolts, as shown.

Referring now to Fig. 2, I have illustrated in a somewhat exaggerated manner the variations in radius of the pipe section 1, and consequently the variation of the distance between the outer surface of the pipe section and the inner face of the middle ring 3. There is no uniformity about these variations, and it is somewhat difficult to represent them on a drawing of the size of Fig. 2, but it will be noticed that the outer surface of the pipe section 1, approaches the inner surface of the middle ring most closely at the point of the weld 2, and that the greatest space between the pipe and middle ring is represented at the line 5—5 on which the section Fig. 5 was taken, and at other points the space between these limits varies. The inner surface of the middle ring is indicated in dotted lines in the upper portion of Fig. 2, and by solid lines at the inner edge of the follower with which it coincides in the lower portion of the figure.

Figure 1:
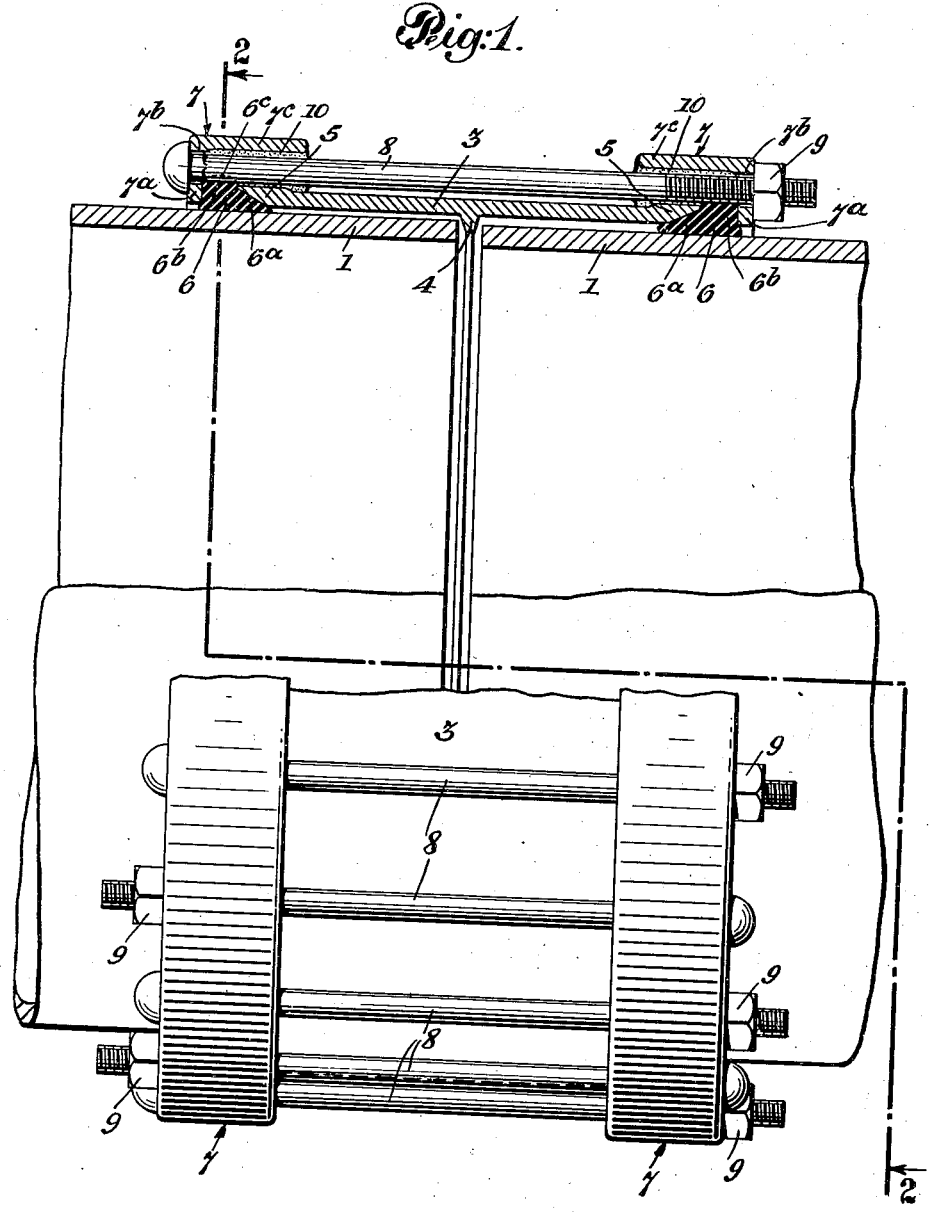
Fig. 1 represents an elevation, partially in section, of a complete coupling embodying my invention for pipe sections of large diameter.
Figure 3:
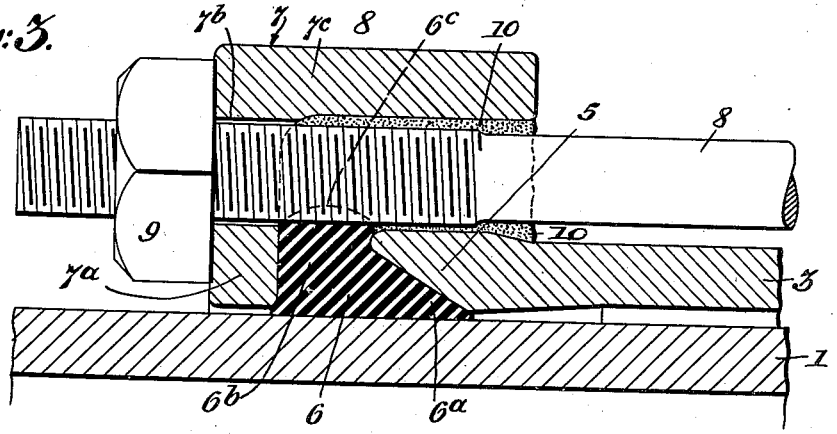
Fig. 3 is an enlarged sectional view of Fig. 2 on the line 3—3, looking in the direction of the arrow in that figure.

Assuming that the coupling has been placed in operative relation with the adjacent ends of two pipe sections, as shown in Fig. 1, and bearing in mind that these adjacent ends will vary from a true cylindrical form in different ways, as indicated in the upper portion of Fig. 2, the nuts are drawn up and the followers drawn toward each other by the clamped bolts. This forces the rubber gaskets into the packing recesses of the middle ring and into firm contact with the outer surface of each of the pipe sections regardless of their surface irregularities or departures from the cylindrical form. Where the pipe surface is comparatively close to the inner surface of the middle ring, as for example, at the left in Fig. 1, and as indicated in Fig. 3, when a tight joint is effected by the compression of the gasket into the packing recess, the exterior portion 6b of the gasket will bulge outwardly as indicated by dotted lines at 6c, in Figs. 1 and 3. The outwardly extending portions of the gasket will encounter and be restrained by engagement with the bolts 8, as clearly shown in Figs. 1 and 3, while it is at liberty to expand outwardly beyond the inner circle of the bolts between adjacent bolts, as there is nothing to confine the outward cold flow of the packing ring, except the bolts themselves.

Figure 4:
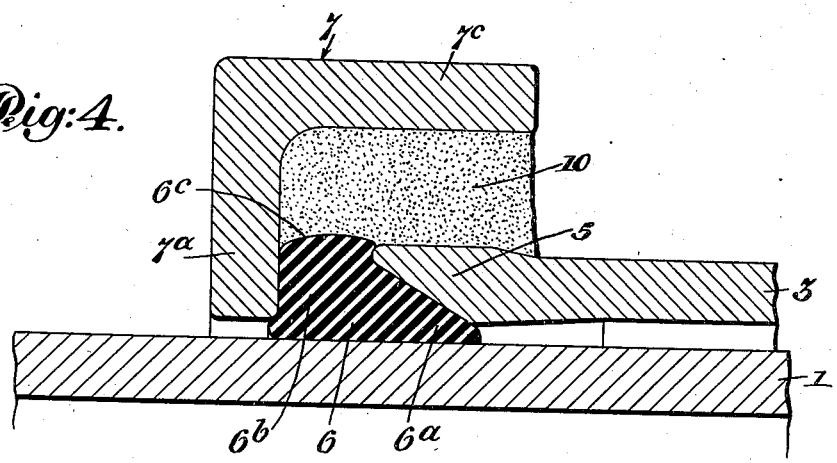
Fig. 4 is a similar view taken on line 4—4 of Fig. 2.
Figure 5:
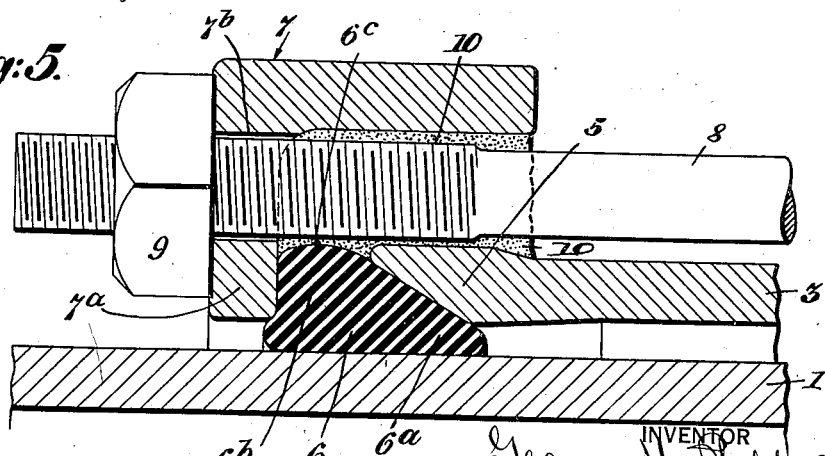
Fig. 5 is another similar view taken on line 5—5 of Fig. 2.

On the other hand, where a greater distance between the pipe and middle ring exists at other portions of the pipe, the same compressive movement of the follower will crowd more of the body of the packing ring into the packing recess of the middle ring and between the middle ring and the outer surface of the pipe as shown in Fig. 4, and there will be less outward cold flow of the exterior portions 6b, of the packing ring. Where the space between the inner surface of the middle ring and the outer surface of the pipe is at maximum due to a flattened or dented portion of the pipe, for example, the follower will crowd additional portions of the gasket into the packing recess and between the middle ring and the outer surface of the pipe, as indicated in Fig. 5, so that there will be little or no extrusion of the exterior portions of the gasket, as clearly illustrated in that figure.

In some instances where the internal pressure to which the pipe line is subjected is extremely low, it may be possible to rely upon the construction thus far described to effect a tight joint, as it will not be necessary to subject the packing ring to such a high degree of pressure as would be the case where the pipe line is subjected to extremely high internal pressures and, in such cases the internal resistance to flow of the rubber in the gasket is sufficient to prevent excessive cold flow of the gasket outwardly after the joint is completed.

I prefer, however, to provide each of the followers with means for positively preventing any further cold flow of the gasket in an outward direction after the coupling has been installed, and the bolts drawn to the proper tension to insure a perfectly fluid tight joint, and this is essential where the pipe line is to be subjected to high internal pressure.

As before stated, this function is supplied by means of a suitable material which can be inserted in plastic or semi-plastic form, so as to completely fill the annular space within the exterior flange 7c, of the follower, and between said flange and the gasket and the portion of the middle ring adjacent thereto, and between and around the bolts 8, as clearly indicated in the drawings at 10. The most satisfactory material for this purpose that has been found thus far is a cement mortar made with one part of Portland cement to two parts of sand. If the couplings are to be subsequently coated with a bituminous enamel, the use of high early strength cement in the grout is recommended, as it materially reduces the setting time and permits an earlier application of the enamel. This cementitious material is carefully packed into the spaces within the cylindrical portion 7c, of the followers so as to entirely fill the space, and when it hardens, the inner surface of the grout will be in contact with the variable extruding or non-extruding portions 6c, of the gaskets, and will form an absolutely rigid retaining wall to prevent any further cold flow or outward extrusion of the gaskets or packing rings, thus holding them under the original high pressure of the followers and bolts, and insuring that the joint shall remain fluid tight at all times.

After the grout has hardened, the entire coupling or any desired parts thereof or of the pipes may be coated with bituminous enamel, to protect the metal parts.

By means of my invention my improved couplings may be made to compensate for all irregularities in the curvature of the pipe wall in the manner previously described, and this has been amply demonstrated by actual tests. In one instance a 73¼ OD coupling embodying my invention was assembled in connection with a piece of commercial pipe of large diameter as received from the mill. The maximum radius of this pipe was 42" and the minimum radius was 29½, as compared with the nominal or standard radius of 36⅝. The radii were measured by means of a dial gauge measuring the rise of arc in a 12" chord. In assembling the coupling a measured bolt load was applied to the follower and for each increment of load a pressure test was run. These pressure tests showed that for any given bolt load on the follower the pressure which the coupling would hold is more than twice that which can be held by couplings employing the so-called T bar type of follower under the same conditions.

It was also found in actual practice that the angle bar follower is considerably stronger than the T bar follower and will sustain a much higher bolt load without excessive deflection or roll. The greater strength of the angle bar follower is due primarily to the fact that the absence of a gasket confining flange permits the bolts to be placed closer to the gasket, and thus reduces the arm of the rolling moment, which has also been verified by repeated tests.

Another incidental advantage of my improved coupling is that the grouting makes it easier to apply a bituminous enamel because there are no pockets or recesses to which the enamel must be applied, since they are completely filled by the grouting. It has also been found that the greater rigidity of the angle bar follower also permits the span between the clamping bolts to be increased, thereby reducing the number of bolts required on couplings of any standard size and effecting a material saving in the time of installation without loss of efficiency.

It will also be seen that the hardened cementitious material or grout, tends to constrain the follower to move with the middle ring during subsequent distortion under external loads imposed by the back fill.

In carrying out my improved process for the connection of pipe sections, and particularly pipe sections of very large diameter in which material variations from the cylindrical form are necessarily encountered, the packing recess at each end of the middle ring will be of such length, and the gasket will be of such length longitudinally of the pipes, that when the clamping bolts are drawn up, the tapered annular portions of each gasket will be confined between the surface of the packing recess and the exterior of the pipe. The annular flange of the follower disposed perpendicularly to the axis of the pipe, confines the outer annular surface or heel of the gasket, and the exterior surface of the pipe confines the inner surface of that portion of the gasket which extends beyond the packing recess in the middle ring, and the portion of the gasket exterior to the packing recess will have been greatly reduced due to the effect of the follower in crowding the gasket into the packing recess to a greater or less extent in accordance with the variable space between the middle ring and the exterior surface of the pipe. The construction of the parts is such that the exposed area, when the gasket is subjected to pressure, is relatively small as compared with the area which is completely confined within the packing recess. Where the clearance between the pipe and middle ring and follower is greater, the gasket will lie deeper in the packing recess than where the clearance between the said parts is less.

However, the greater lateral extrusion of the gasket at the regions of less pipe clearance is not only necessary and desirable, for the purpose of effecting a tight joint all the way around the pipe, but is also tolerable, since the desired gasket sealing pressure is more readily attained in these regions than at regions where the clearances are greater.

By proper proportioning of the parts, a substantially constant total of confinement of the gasket throughout the circumference of the pipe irrespective of variations in the exterior diameter of the pipe may be obtained, and at the same time, the total mass of the gasket material extending outside of the packing recess is in no case sufficiently great to result in excessive loss of pressure due to cold flow after the clamping bolts are tightened. As a matter of fact, there must be a certain amount of the gasket extending beyond and exterior to the packing recess at all points as otherwise the follower might come into contact at some point with the end of the middle ring and prevent the proper compression of the gasket.

Of course, where the cementitious material is employed to fill the space between the external portions of the gasket and the cylindrical outer confining flange of the follower, there is no possibility of any cold flow of these portions of the gasket, and the cementitious material seals the joint and protects the gaskets from deterioration due to the presence in the surrounding soil of gasket deteriorants.

In actual practice, the use of the cementitious material will depend upon the actual conditions under which the pipes are installed, and coupled, such as internal line pressure and presence of gasket deteriorants in the soil, the presence of moisture and other factors.

It will be clearly understood that my invention is applicable to couplings of the bell and spigot type in which the outer end of the bell will correspond to one end of the middle ring therein shown, and in such case obviously, a series of through bolts may be used with nuts on their threaded ends engaging the follower to draw it towards the bell end and force the gasket into the packing recess and between the inner face of the recess and the variable outer surface of the pipe inserted therein, the opposite ends of the bolts being anchored to the bell in any usual or preferred manner.

What I claim and desire to secure by Letters Patent is:

1. In a pipe coupling for plain end pipe, a cylindrical member for enclosing the end portion of a pipe section and provided with an end packing recess having an outwardly flared inner surface, a gasket surrounding the pipe end, and having a portion substantially conforming to the flared surface of the packing recess, and being of greater extent parallel to the axis of the pipe than the packing recess, a follower provided with an annular flange substantially perpendicular to the axis of the pipe for engaging said gasket, and a cylindrical reinforcing flange extending about but spaced from the end portion of said cylindrical member, said follower being provided with a circular series of bolt holes extending through said annular flange inside said cylindrical flange and having the inner edges of said holes closely adjacent the outer face of the gasket, and clamping bolts engaging the bolt holes in said follower, and nuts on said bolts for applying pressure to the gasket to cause it to flow to variable extents into the packing recess at different points around the pipe to completely fill said recess, the portions of the gasket exterior to said recess being unconfined by said cylindrical flange and free to flow outwardly to varying extents to compensate for the varying flow of the gasket into the packing recess due to out of roundness of the pipe section, thereby producing a uniform seal.

2. In a pipe coupling for plain end pipe, a cylindrical member for enclosing the end portion of a pipe section and provided with an end packing recess having an outwardly flared inner surface, a gasket surrounding the pipe end, and having a portion substantially conforming to the flared surface of the packing recess, and being of greater extent parallel to the axis of the pipe than the packing recess, a follower provided with an annular flange substantially perpendicular to the axis of the pipe for engaging said gasket, and a cylindrical reinforcing flange extending about but spaced from the end portion of said cylindrical member, said follower being provided with a circular series of bolt holes extending through said annular flange inside said cylindrical flange and having the inner edges of said holes closely adjacent the outer face of the gasket, and clamping bolts engaging the bolt holes in said follower, and nuts on said bolts for applying pressure to the gasket to cause it to flow to variable extents into the packing recess at different points around the pipe to completely fill said recess, the portions of the gasket exterior to said recess being unconfined by said cylindrical flange and free to flow outwardly to varying extents to compensate for the varying flow of the gasket into the packing recess due to out of roundness of the pipe section, thereby producing a uniform seal, a filling of hardened plastic material being interposed between the cylindrical reinforcing flange of the follower and the variable outer periphery of the exterior portions of the gasket to prevent further outward flow of the gasket.

GEORGE H. PFEFFERLE.